(12) United States Patent
Zhang et al.

(10) Patent No.: US 10,394,092 B2
(45) Date of Patent: Aug. 27, 2019

(54) DISPLAY SUBSTRATE AND METHOD OF MANUFACTURING THE SAME, AND DISPLAY DEVICE

(71) Applicants: BOE TECHNOLOGY GROUP CO., LTD., Beijing (CN); Ordos Yuansheng Optoelectronics Co., Ltd., Ordos, Inner Mongolia (CN)

(72) Inventors: Han Zhang, Beijing (CN); Xiaozhou Zhan, Beijing (CN)

(73) Assignees: BOE TECHNOLOGY GROUP CO., LTD., Beijing (CN); ORDOS YUANSHENG OPTOELECTRONICS CO., LTD., Ordos, Inner Monogolia (CN)

( * ) Notice: Subject to any disclaimer, the term of this patent is extended or adjusted under 35 U.S.C. 154(b) by 101 days.

(21) Appl. No.: 15/502,992

(22) PCT Filed: Aug. 9, 2016

(86) PCT No.: PCT/CN2016/094162
§ 371 (c)(1),
(2) Date: Feb. 9, 2017

(87) PCT Pub. No.: WO2017/118016
PCT Pub. Date: Jul. 13, 2017

(65) Prior Publication Data
US 2018/0210294 A1    Jul. 26, 2018

(30) Foreign Application Priority Data

Jan. 4, 2016   (CN) .......................... 2016 1 0006384

(51) Int. Cl.
*G02F 1/1343*   (2006.01)
*G02F 1/136*    (2006.01)
(Continued)

(52) U.S. Cl.
CPC ........ *G02F 1/134336* (2013.01); *G02F 1/136* (2013.01); *G06F 3/044* (2013.01);
(Continued)

(58) Field of Classification Search
CPC ...... G06F 3/0412; G06F 3/0418; G06F 3/044; G06F 3/0416; G06F 2203/041;
(Continued)

(56) References Cited

U.S. PATENT DOCUMENTS

2012/0127413 A1* 5/2012 Shin ...................... G06F 3/0412
349/139
2013/0299222 A1* 11/2013 Lee ......................... G06F 3/044
174/258

(Continued)

FOREIGN PATENT DOCUMENTS

| CN | 103278955 A | 9/2013 |
| CN | 104076997 A | 10/2014 |

(Continued)

OTHER PUBLICATIONS

First Office Action of Counterpart Chinese Patent Application No. 201610006384.7, dated Aug. 3, 2016, 9 pages.
(Continued)

*Primary Examiner* — Hoan C Nguyen
(74) *Attorney, Agent, or Firm* — Kinney & Lange, P.A.

(57) ABSTRACT

The present disclosure provides a display substrate and a method of manufacturing the same, and a display device. The display substrate includes a base substrate and a sensing electrode layer located on one side of the base substrate, the sensing electrode layer comprising a sensing electrode and a dummy pattern that comprises dummy sub-patterns arranged into columns, each dummy sub-pattern having a
(Continued)

first border defining the dummy sub-pattern in a column direction, and first borders of the dummy sub-patterns being non-periodically arranged.

18 Claims, 4 Drawing Sheets

(51) Int. Cl.
 G06F 3/041 (2006.01)
 G06F 3/044 (2006.01)
 G02F 1/1333 (2006.01)
(52) U.S. Cl.
 CPC .......... G06F 3/0412 (2013.01); G06F 3/0416 (2013.01); *G02F 1/13338* (2013.01); *G06F 2203/04103* (2013.01)
(58) Field of Classification Search
 CPC .. G02F 1/13338; G02F 1/1336; G02F 3/0412; G02F 3/0416; G02F 2203/04103; G02F 1/133512; G02F 1/134336; G02F 1/136
 See application file for complete search history.

(56) References Cited

U.S. PATENT DOCUMENTS

| | | | |
|---|---|---|---|
| 2014/0293159 A1* | 10/2014 | Adachi | G06F 3/0412 349/12 |
| 2015/0042909 A1 | 2/2015 | Sekiguchi | |
| 2016/0018348 A1* | 1/2016 | Yau | G06F 3/044 324/697 |
| 2016/0062537 A1* | 3/2016 | Kim | G06F 3/0416 345/174 |
| 2016/0103526 A1* | 4/2016 | Sohn | H05K 999/99 345/174 |
| 2016/0109977 A1* | 4/2016 | Hashimoto | G06F 3/044 345/174 |

FOREIGN PATENT DOCUMENTS

| | | |
|---|---|---|
| CN | 104076998 A | 10/2014 |
| CN | 104331205 A | 2/2015 |
| JP | 2015035122 A | 2/2015 |

OTHER PUBLICATIONS

International Search Report and Written Opinion from PCT Application Serial No. PCT/CN2016/094162, dated Nov. 9, 2016, 11 pages.

Chinese Search Report, for Chinese Patent Application No. 201610006384.7, dated May 16, 2016, 11 pages.

* cited by examiner

Fig. 4 forming a sensing electrode layer on a side of the base substrate through a patterning process such that the sensing electrode layer comprising a sensing electrode and a dummy pattern that comprises dummy sub-patterns arranged into columns, and borders of the dummy sub-patterns in a row direction being non-periodically arranged ⎯ S101

Fig. 5

DISPLAY SUBSTRATE AND METHOD OF MANUFACTURING THE SAME, AND DISPLAY DEVICE

CROSS-REFERENCE TO RELATED APPLICATION(S)

The present application claims priority to Chinese Patent Application Serial No. 201610006384.7 filed on Jan. 4, 2016 in the State Intellectual Property Office of China, a whole disclosure of which is incorporated herein by reference.

BACKGROUND

Technical Field

Embodiments of the present disclosure relate to the field of display technologies, and more particularly, to a display substrate and a method of manufacturing the same, and a display device.

Description of the Related Art

With market share of in-cell touch devices being increased year by year, research and development of the in-cell touch devices also become more urgent.

Among in-cell touch devices, hybrid in-cell touch devices are applied more and more extensively.

In the hybrid in-cell touch device, a sensing electrode layer comprises a sensing electrode and a dummy pattern, and the dummy pattern may include dummy sub-patterns. Among others, it is found in experiments by inventors that the dummy sub-patterns are periodically arranged to be separated from each other, thereby resulting in generation of a grid pattern during display.

SUMMARY

An object of the present disclosure is to provide a display substrate and a method of manufacturing the same, and a display device, for avoiding generation of any grid pattern during display.

In order to achieve the above object, the present disclosure provides a display substrate, comprising a base substrate and a sensing electrode layer located on one side of the base substrate, the sensing electrode layer comprises a sensing electrode and a dummy pattern, the dummy pattern comprises dummy sub-patterns arranged into columns, each dummy sub-pattern has a first border defining the dummy sub-pattern in a column direction, and first borders of respective dummy sub-patterns are non-periodically arranged.

Optionally, the first borders of the dummy sub-patterns are arranged obliquely.

Optionally, first borders of two adjacent columns of dummy sub-patterns are oblique in different directions.

Optionally, endpoints of first borders of dummy sub-patterns in a column of dummy sub-patterns and endpoints of first borders of dummy sub-patterns in an adjacent column of dummy sub-patterns are arranged in a staggered manner.

Optionally, angles between the first borders of two adjacent columns of dummy sub-patterns and a vertical line extending in a column direction are the same.

Optionally, angles between the first borders of two adjacent columns of dummy sub-patterns and a vertical line extending in a column direction are different from one another.

Optionally, an angle between the first border of the dummy sub-pattern and a vertical line extending in a column direction is greater than 0° and less than 85°.

Optionally, the angle between the first border of the dummy sub-pattern and the vertical line extending in the column direction is greater than 5° and less than 85°; or the angle between the first border of the dummy sub-pattern and the vertical line extending in the column direction is greater than 0° and less than 45°; or the angle between the first border of the dummy sub-pattern and the vertical line extending in the column direction is greater than 5° and less than 45°.

Optionally, each dummy sub-pattern has a second border defining the dummy sub-pattern in a row direction, the second border is formed into a polygonal line, and corners of the polygonal line are located at positions corresponding to a black matrix.

Optionally, the black matrix is located on the other side of the base substrate opposite to the side where the sensing electrode layer is located.

Optionally, each of the second borders of the dummy sub-patterns is formed into a polygonal line, and adjacent polygonal lines are arranged in an axial symmetric manner.

Optionally, the sensing electrode comprises a connection portion and sensing sub-electrodes, and the sensing sub-electrodes are arranged into columns and connected with each other by the connection portion.

Optionally, the connection portion is arranged in the same layer as the sensing sub-electrodes, and the connection portion is located on an upper side of the sensing sub-electrodes, on a lower side of the sensing sub-electrodes, or on both the upper side and the lower side of the sensing sub-electrodes.

Optionally, the sensing sub-electrodes and the connection portion are formed integrally, and the sensing sub-electrodes each have a strip-shaped structure.

Optionally, angles between the first borders of the dummy sub-patterns in a column of dummy sub-patterns and a vertical line extending in a column direction are the same.

Optionally, angles between the first borders of dummy sub-patterns in a column of dummy sub-patterns in the row direction and a vertical line extending in a column direction are different from one another.

In order to achieve the above object, the present disclosure provides a display device, comprising the display substrate as described above and an opposing substrate arranged opposite to the display substrate. Optionally, a liquid crystal layer is provided between the opposing substrate and the display substrate, and the sensing electrode layer is located on a side of the base substrate facing away from the liquid crystal layer.

In order to achieve the above object, the present disclosure provides a method of manufacturing a display substrate, comprising: forming a sensing electrode layer on a side of the base substrate through a patterning process such that the sensing electrode layer comprises a sensing electrode and a dummy pattern that comprises dummy sub-patterns arranged into columns, each dummy sub-pattern having a first border defining the dummy sub-pattern in a column direction, and first borders of respective dummy sub-patterns being non-periodically arranged.

BRIEF DESCRIPTION OF THE DRAWINGS

In order to clearly describe technique schemes in embodiments of the present application, accompanying drawings used for illustrating the embodiments will be simply described. Obviously, the accompanying drawings described below merely refer to some embodiments described in the present application, and those ordinary skilled in the art may arrive at other accompanying drawings based on these accompanying drawings without any inventive work. The following drawings are not scaled proportionally by actual sizes, but focus on showing purposes of the present application.

DETAILED DESCRIPTION OF PREFERRED EMBODIMENTS

A clear and complete description of the technique schemes according to embodiments of the present disclosure will be made as below with reference to the accompanying drawings. Obviously, the embodiments described are merely parts, instead of all, of embodiments of the present disclosure. Any embodiment that is obtained based on the embodiments of the present disclosure by those skilled in the art without inventive labor will fall into protective scopes of the present disclosure.

Unless otherwise defined, technical terms or scientific terms used herein should be interpreted with their general meanings which are understood by those skilled in the art to which they pertain. Terms such as "first", "second" and the like used in the description and claims of the present disclosure are not intended to limit in terms of order, quantity or importance in any way, and rather, are only used to distinguish different components by naming. Also, wordings such as "an", "a" or "one" and the like do not indicate any quantity limitation, but mean presence of at least one. Wordings such as "connect", "couple" and the like are not limited to a physical or mechanical connection, and may include an electrical connection, no matter whether it is direct or indirect. Terms such as "upper", "lower", "left", "right" and the like only represent relative positional relationships, and when an absolute position of a described subject varies, the relative positional relationships will changes accordingly.

For a better understanding of technique schemes of the present disclosure by those skilled in the art, a display substrate and a method of manufacturing the same, and a display device according to the present disclosure will be described hereinafter in detail with reference to the drawings.

Figure 1:
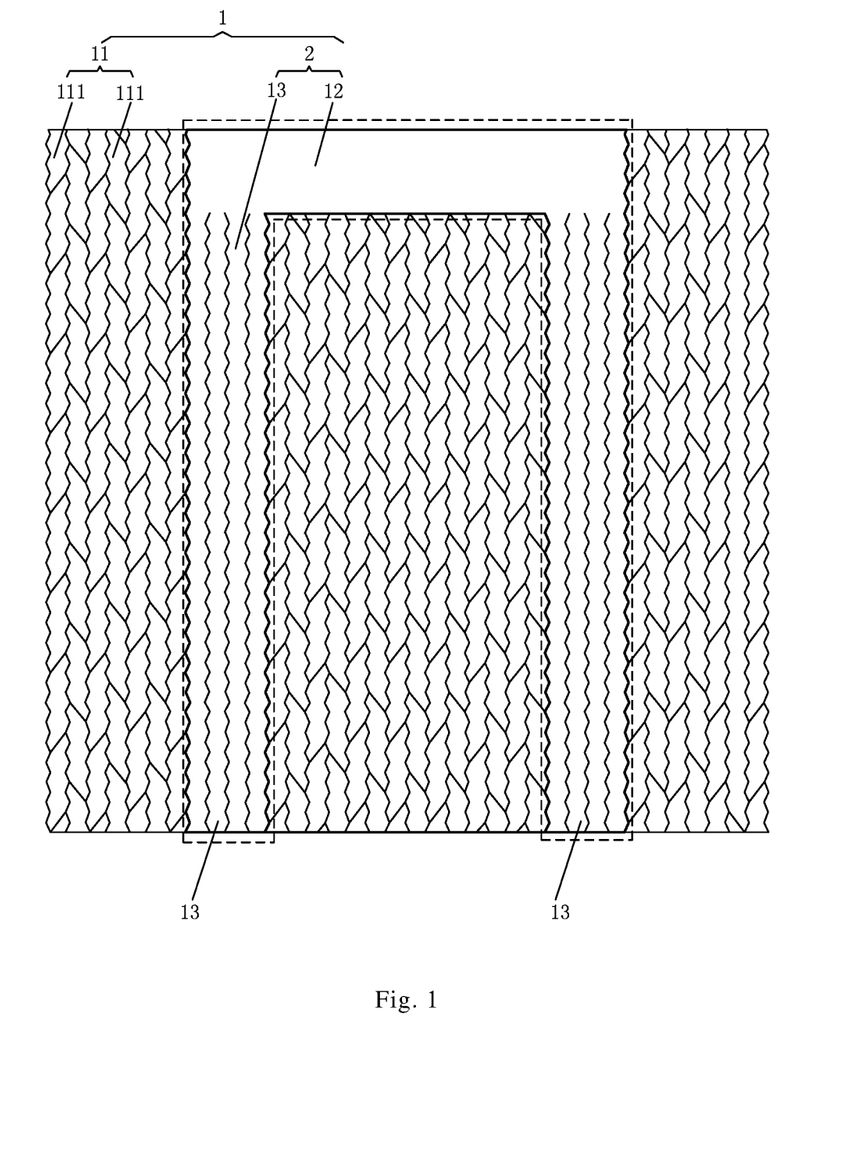
FIG. 1 is a structural schematic diagram of a display substrate according to an embodiment of the present disclosure.
Figure 2:
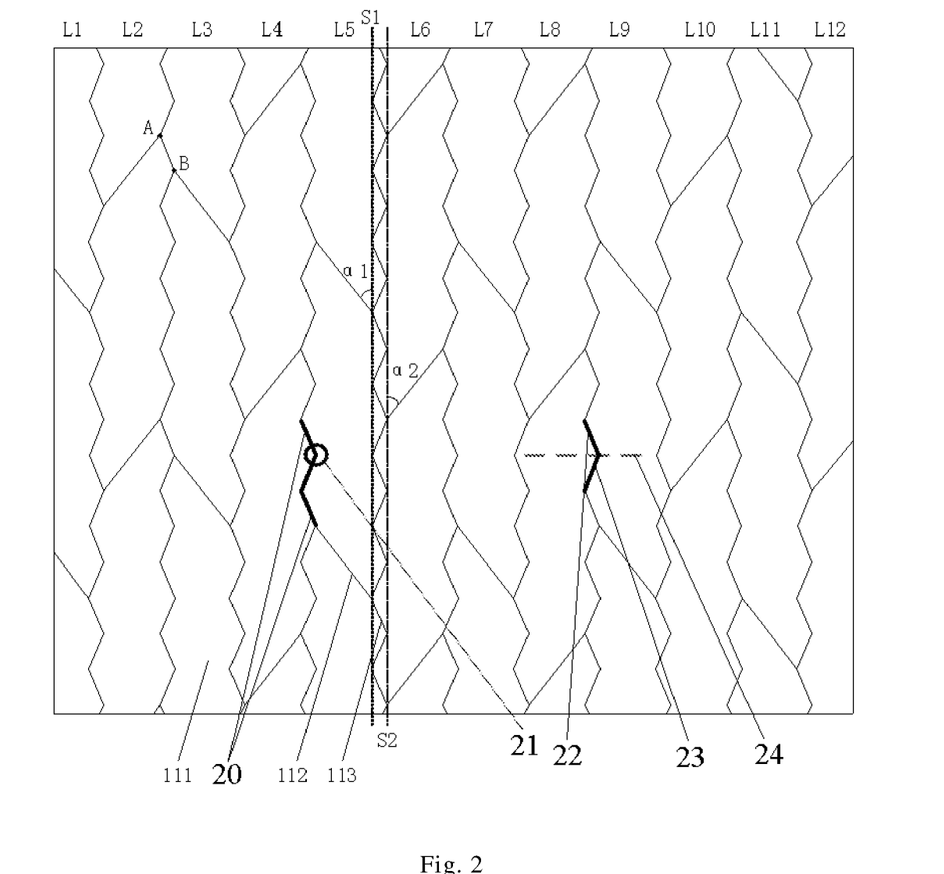
FIG. 2 is an enlarged schematic diagram of a dummy pattern showing in FIG. 1.

FIG. 1 is a structural schematic diagram of a display substrate according to an embodiment of the present disclosure, and FIG. 2 is an enlarged schematic diagram of a dummy pattern showing in FIG. 1. As shown in FIG. 1 and FIG. 2, the display substrate comprises a base substrate and a sensing electrode layer 1 located on aside of the base substrate, the sensing electrode layer 1 comprises a sensing electrode 2 and a dummy pattern 11 that comprises dummy sub-patterns 111 arranged into columns, each dummy sub-pattern 111 has a first border 112 defining the dummy sub-pattern in a column direction, and first borders 112 of the dummy sub-patterns 111 are non-periodically arranged; exemplarily, the first borders 112 of the dummy sub-patterns 111 have different or irregular arrangement patterns or rules, for example, are arranged non-periodically in a row direction.

It is noted that the base substrate is located below the sensing electrode 2 and the dummy pattern 11, thus it is not particularly shown in FIG. 1 and FIG. 2. Further, FIG. 1 and FIG. 2 only show some of structures of the display substrate as an example.

In an embodiment, the sensing electrode 2 comprises a connection portion 12 and sensing sub-electrodes 13, and the sensing sub-electrodes 13 are arranged into columns and connected with each other by the connection portion 12. Structure of the sensing electrode 2 may refer to that in a broken line frame shown in FIG. 1. In an example, the connection portion 12 may be arranged in the same layer as the sensing sub-electrodes 13, and the connection portion may be located on an upper side and/or a lower side of the sensing sub-electrodes 13. FIG. 1 only shows the connection portion 12 located on the upper side of the sensing sub-electrode 13, and does not show a connection portion located on the lower side of the sensing sub-electrode. Optionally, the sensing sub-electrode 13 and the connection portion 12 are formed integrally. Optionally, the sensing sub-electrode 13 has a strip-shaped structure. In an embodiment, the structure of the dummy pattern 11 matches with that of the sensing sub-electrode 13 so as to facilitate design of patterns by a designer, thereby reducing a difference between them as much as possible to avoid defects of a product.

It is noted that in the figures, the dummy sub-patterns 111 are spaced apart from each other, the dummy sub-patterns 111 is spaced apart from the sensing electrode 2, and the sensing sub-electrodes 13 are spaced apart from each other. In the figures, a separation line is drawn simply for representing borders of adjacent dummy sub-patterns 111, a separation line is drawn simply for representing borders of the dummy sub-pattern 111 and the sensing electrode 2, and a separation line is drawn simply for representing borders of adjacent sensing sub-electrodes 13, all of which are only examples to illustrate that patterns on two sides of the separation line are separated from each other. In fact, each of the dummy sub-patterns 111 has its own respective borders, each sensing electrode 2 has its own respective borders, and the sensing sub-electrodes 13 each have their own respective borders. A gap is formed at a position where two patterns are spaced apart from each other. That is, a gap is formed between borders of adjacent dummy sub-patterns 111, a gap is formed between borders of a respective one of the dummy sub-patterns 111 and the sensing electrode 2, and a gap is formed between borders of adjacent sensing sub-electrodes 13.

The sensing electrode 2 and the dummy pattern 11 are arranged in a same layer, that is, the sensing electrode 2 and the dummy pattern 11 are both located in the sensing electrode layer 1.

As shown in FIG. 2, the dummy sub-patterns 111 each have four borders, which include two first borders 112 defining the dummy sub-pattern in the column direction and two second borders 113 defining the dummy sub-pattern in the row direction. The dummy sub-patterns 111 each are delimited by the two first borders 112 and the two second borders 113.

Optionally, the first borders 112 of the dummy sub-patterns 111 are arranged obliquely. Optionally, the first borders 112 of two adjacent columns of dummy sub-patterns 111 have different oblique directions. Optionally, endpoints of the first borders of two adjacent columns of dummy sub-patterns 111 are arranged in a staggered manner. FIG. 2 shows twelve columns of the dummy sub-patterns 111, which include the L1st column of the dummy sub-patterns 111, the L2nd column of the dummy sub-patterns 111, . . . , and the L12th column of the dummy sub-patterns 111. Taking the adjacent L2nd and L3rd columns of the dummy sub-patterns 111 as an example, the first borders 112 of the L2nd column of the dummy sub-patterns 111 are inclined from a left lower side to a right upper side, the first borders 112 of the L3rd columns of the dummy sub-patterns 111 adjacent to the L2nd column are inclined from a left upper side to a right lower side. Taking an endpoint A of one of the first borders 112 of the L2nd column of the dummy sub-patterns 111 and an endpoint B of one of the first borders 112 of the L3rd column of the dummy sub-patterns 111 as an example, the endpoint A and the endpoint B are adjacent to each other, and the endpoint A and the endpoint B are arranged in a staggered manner, thereby further avoiding defects such as grid pattern during display.

Optionally, angles between the first borders 112 of dummy sub-patterns in a column of dummy sub-patterns and a vertical line extending in the column direction are the same. In practice, optionally, angles between the first borders of respective dummy sub-patterns in a column of dummy sub-patterns and the vertical line extending in the column direction may be different from one another, which will not be particularly shown.

Optionally, angles between the first borders 112 of two adjacent columns of dummy sub-patterns 111 and a vertical line extending in the column direction are the same. Exemplarily, the vertical line extending in the column direction is a straight line arranged in the column direction. Taking the L5th and L6th columns of the dummy sub-patterns 111 as an example, the vertical line extending in the column direction corresponding to the L5th column of the dummy sub-patterns 111 is line S1, and the vertical line extending in the column direction corresponding to the L6th column of the dummy sub-patterns 111 is line S2, where the line S1 is parallel to the line S2. The angle between the first border 112 of the L5th column of dummy sub-patterns 111 and the vertical line extending in the column direction is $\alpha1$, and the angle between the first border 112 of the L6th column of dummy sub-patterns 111 and the vertical line extending in the column direction is $\alpha2$, where $\alpha1$ is equal to $\alpha2$. When the angles between the first borders 112 and the vertical line extending in the column direction are the same, it is beneficial for design of patterns by a designer. In practice, optionally, angles between the first borders 112 of two adjacent columns of dummy sub-patterns 111 and the vertical line extending in the column direction may be different from one another, which will not be particularly shown. When the angles between the first borders 112 and the vertical line extending in the column direction are different from one another, it can further avoid defects such as grid pattern during display.

In an embodiment, the angle between the first border 112 of the dummy sub-pattern 111 and the vertical line extending in the column direction is greater than 0° and less than 85°. Taking the L6th column of the dummy sub-patterns 111 as an example, the angle $\alpha2$ between the first border 112 of the dummy sub-pattern 111 and the vertical line extending in the column direction is greater than 0° and less than 85°.

Optionally, the angle between the first border 112 of the dummy sub-pattern 111 and the vertical line extending in the column direction is greater than 5° and less than 85°, thereby avoiding Moire due to interference between the dummy pattern and a pixel electrode.

Optionally, the angle between the first border 112 of the dummy sub-pattern 111 and the vertical line extending in the column direction is greater than 0° and less than 45°, such that the sensing electrode can be provided with a better sensing electrical characteristic.

Optionally, the angle between the first borders 112 of the dummy sub-patterns 111 and the vertical line extending in the column direction is greater than 5° and less than 45°, thereby not only avoiding Moire due to interference between the dummy pattern and a pixel electrode, but also providing the sensing electrode with a better sensing electrical characteristic.

Figure 3:
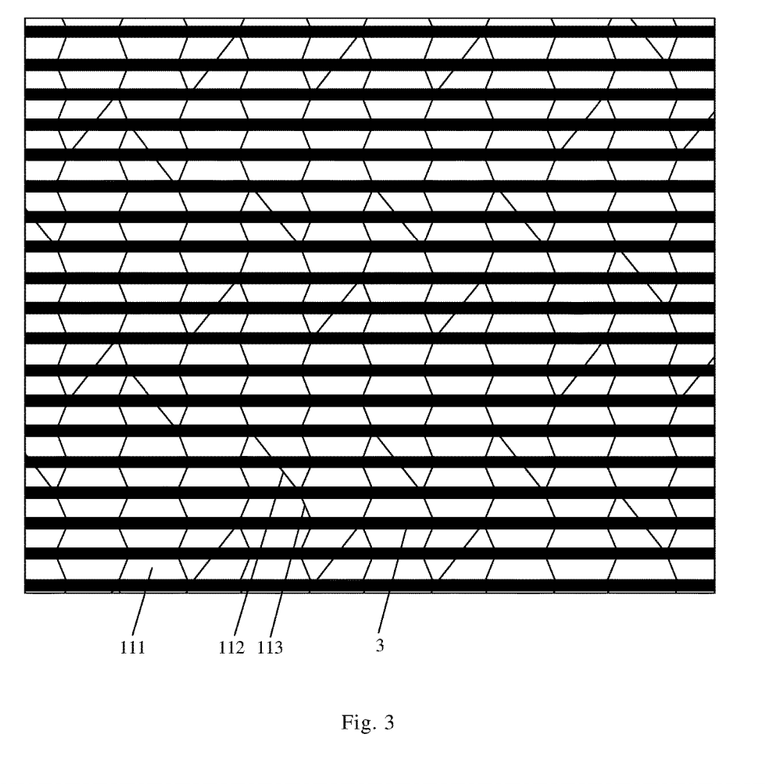
FIG. 3 is a schematic diagram showing correspondence relation between the dummy pattern shown in FIG. 2 and a black matrix.

FIG. 3 is a schematic diagram showing correspondence relation between the dummy pattern shown in FIG. 2 and a black matrix. As shown in FIGS. 2 and 3, the second border 113 of the dummy sub-pattern is formed into a polygonal line 20, and corners 21 of the polygonal line 20 are located at positions corresponding to a black matrix 3; for example, positions of the corners 21 of the polygonal line 20 correspond to the black matrix 3, or the corners 21 of the polygonal line 20 overlap with the black matrix 3 in a direction perpendicular to the substrate or are covered by the black matrix 3. Thereby, a light diffraction phenomenon can be effectively prevented at the corners.

In an embodiment, the display substrate and an opposing substrate are assembled into a cell so as to form a display device, and a liquid crystal layer is provided between the display substrate and the opposing substrate. The display substrate may be color substrate, and the opposing substrate may be an array substrate. Optionally, the black matrix is located on the other side of the base substrate opposite to the side where the sensing electrode layer is located. In an embodiment, the one side of the base substrate (the side of the base substrate where the sensing electrode layer is located) is an outer side of the base substrate, that is, a side of the base substrate facing away from the liquid crystal layer after the display substrate and the opposing substrate are assembled into a cell; the other side of the base substrate opposite to the side where the sensing electrode layer is located is an inner side of the base substrate, that is, a side of the base substrate adjacent to the liquid crystal layer after the display substrate and the opposing substrate are assembled into a cell.

In an embodiment, two adjacent strips of the black matrix 3 and two adjacent polygonal lines define a preset number of pixel regions in the column direction, where the preset number is a positive integer. Thereby, a straight length of the polygonal line in the column direction is equal to a sum of straight lengths of the preset number of pixel regions in the column direction. Optionally, two pixel regions are defined in the column direction between two adjacent strips of black matrix 3 and two adjacent polygonal lines.

In an embodiment, the first border 112 of the dummy sub-pattern is formed into a polygonal line 20 composed of a plurality of sub-lines, and adjacent sub-lines are arranged in an axial symmetric manner. Specifically, adjacent sub-lines are symmetric with respect to an axis of symmetry 24, for example, a first sub-line 22 and a second sub-line 23 are symmetric with respect to an axis of symmetry 24.

In the above embodiments, the first borders of the dummy sub-patterns 111 are non-periodically arranged, so that the gaps among dummy sub-patterns 111 are prevented from forming into or becoming into a straight line in the row direction in sense of a macroscopic view, thereby avoiding the gaps among dummy sub-patterns 111 from forming or becoming into a straight line in the row direction and thus avoiding any grid pattern from being generated.

With technique schemes of the display substrate according to the above embodiments, the sensing electrode layer comprises a sensing electrode and a dummy pattern that comprises dummy sub-patterns arranged into columns, each dummy sub-pattern has a first border defining the dummy sub-pattern in a column direction, and first borders of the dummy sub-patterns are non-periodically arranged, so that gaps among dummy sub-patterns are prevented from forming into or becoming into a straight line in the row direction, thereby avoiding generation of any grid pattern during displaying.

Figure 4:
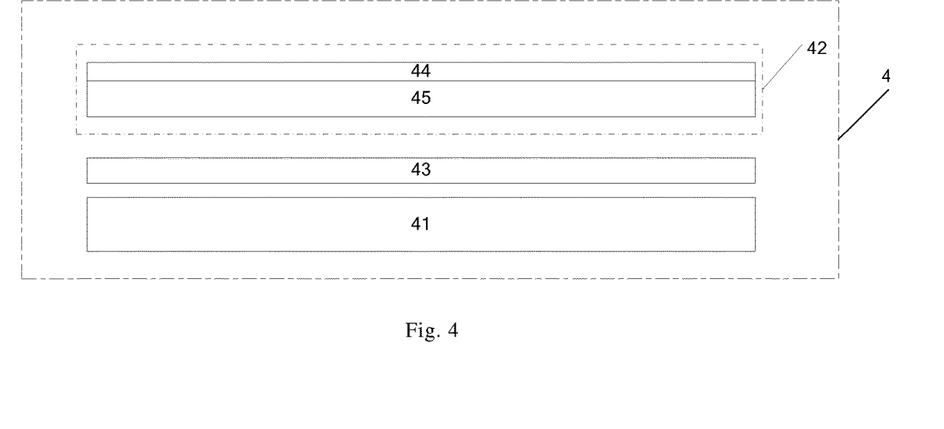
FIG. 4 is a schematic diagram of a display device according to an embodiment of the present disclosure.

As shown in FIG. 4, an embodiment of the present disclosure provides a display device 4, comprising: an opposing substrate 41 and a display substrate 42 which are arranged opposite to each other. The display substrate 42 may be any one of those described above with reference to FIGS. 1-3.

In an embodiment, the display substrate 42 and the opposing substrate 41 are assembled into a cell so as to form the display device 4, and a liquid crystal layer 43 is provided between the display substrate 42 and the opposing substrate 41. Optionally, the opposing substrate 41 is an array substrate, and the display substrate 42 is a color substrate. In an example, the sensing electrode layer 44 is located on one side of the base substrate 45 facing away from the liquid crystal layer.

In an embodiment, the display device 4 may be a hybrid in-cell touch device.

With technique schemes of the display device according to the above embodiments, the sensing electrode layer comprises a sensing electrode and a dummy pattern that comprises dummy sub-patterns arranged into columns, each dummy sub-pattern has a first border defining the dummy sub-pattern in a column direction, and first borders of the dummy sub-patterns are non-periodically arranged, so that gaps among dummy sub-patterns are prevented from forming into or becoming into a straight line in the row direction, thereby avoiding generation of any grid pattern during display.

Figure 5:
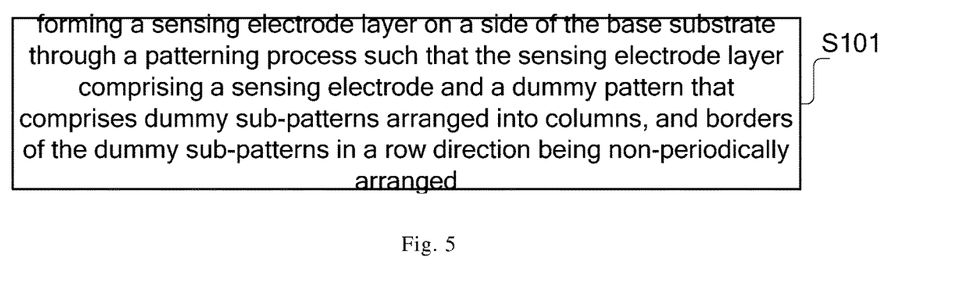
FIG. 5 is a flow chart showing a method of manufacturing a display substrate according to an embodiment of the present disclosure.

As shown in FIG. 5, an embodiment of the present disclosure provides a method of manufacturing a display substrate, comprising:

Step S101: forming a sensing electrode layer on a side of the base substrate through a patterning process such that the sensing electrode layer comprises a sensing electrode and a dummy pattern that comprises dummy sub-patterns arranged into columns, each dummy sub-pattern having a first border defining the dummy sub-pattern in a column direction, and borders of the dummy sub-patterns in a row direction being non-periodically arranged.

Exemplarily, a sensing electrode material layer is formed on one side of the base substrate, and the sensing electrode material layer is patterned to form a sensing electrode layer, which comprises a sensing electrode and a dummy pattern.

The method of manufacturing a display substrate according to this embodiment may be used to manufacture the display substrate as described above.

With the technique scheme of the method of manufacturing a display substrate according to the above embodiment, the sensing electrode layer comprises a sensing electrode and a dummy pattern that comprises dummy sub-patterns arranged into columns, each dummy sub-pattern has a first border defining the dummy sub-pattern in a column direction and first borders of the dummy sub-patterns are non-periodically arranged, so that gaps among dummy sub-patterns are prevented from forming into or becoming into a straight line in the row direction, thereby avoiding generation of any grid pattern during display.

It should be understood that the above embodiments are merely exemplary embodiments of the present disclosure and are not intended to limit the present disclosure. For those skilled in the art, various modifications and changes may be made to the embodiments of the present disclosure without deviating from the spirit and scope of the present disclosure, and all the modifications, alternatives and equivalents fall within the scopes of the present invention.

What is claimed is:

1. A display substrate, comprising:
a base substrate, and
a sensing electrode layer located on a first side of the base substrate,
wherein the sensing electrode layer comprises a sensing electrode and a dummy pattern, the dummy pattern comprising dummy sub-patterns arranged into columns, each dummy sub-pattern having a first border defining the dummy sub-pattern in a column direction, and first borders of respective dummy sub-patterns being non-periodically arranged,
wherein each dummy sub-pattern has a second border defining the dummy sub-pattern in a row direction, the second border is formed into a polygonal line, and corners of the polygonal line are covered by a black matrix,
wherein two adjacent strips of the black matrix and two adjacent polygonal lines define a preset number of pixel regions in the column direction, where the preset number is a positive integer, and
wherein the black matrix is located on a second side of the base substrate opposite to the first side where the sensing electrode layer is located.

2. The display substrate according to claim 1, wherein the first borders of the dummy sub-patterns are arranged obliquely.

3. The display substrate according to claim 2, wherein first borders of a first column of dummy sub-patterns are oblique in different directions from first borders of a second adjacent column of dummy sub-patterns.

4. The display substrate according to claim 3, wherein endpoints of first borders of a first column of dummy sub-patterns and endpoints of first borders of a second adjacent column of dummy sub-patterns are arranged in a staggered manner.

5. The display substrate according to claim 2, wherein endpoints of first borders of a first column of dummy sub-patterns and endpoints of first borders of a second adjacent column of dummy sub-patterns are arranged in a staggered manner.

6. The display substrate according to claim 1, wherein an angle between each of the first borders of a first column of dummy sub-patterns and a vertical line extending in a column direction is the same as an angle between each of the first borders of a second adjacent column of dummy sub-patterns and the vertical line.

7. The display substrate according to claim 1, wherein an angle between each of the first borders of a first column of dummy sub-patterns and a vertical line extending in a column direction is different from an angle between each of the first borders of a second adjacent column of dummy sub-patterns and the vertical line.

8. The display substrate according to claim 1, wherein an angle between the first border of the dummy sub-pattern and a vertical line extending in a column direction is greater than 0° and less than 85°.

9. The display substrate according to claim 8, wherein
the angle between the first border of the dummy sub-pattern and the vertical line extending in the column direction is greater than 5° and less than 85°; or
the angle between the first border of the dummy sub-pattern and the vertical line extending in the column direction is greater than 0° and less than 45°; or
the angle between the first border of the dummy sub-pattern and the vertical line extending in the column direction is greater than 5° and less than 45°.

10. The display substrate according to claim 1, wherein the polygonal line is composed of a plurality of sub-lines, and adjacent sub-lines are arranged in an axial symmetric manner.

11. The display substrate according to claim 1, wherein the sensing electrode comprises a connection portion and sensing sub-electrodes, and the sensing sub-electrodes are arranged into columns and connected with each other by the connection portion.

12. The display substrate according to claim 11, wherein the connection portion is arranged in the same layer as the sensing sub-electrodes, and the connection portion is located on an upper side of the sensing sub-electrodes, on a lower side of the sensing sub-electrodes, or on both the upper side and the lower side of the sensing sub-electrodes.

13. The display substrate according to claim 12, wherein the sensing sub-electrodes and the connection portion are formed integrally, and the sensing sub-electrodes each have a strip-shaped structure.

14. The display substrate according to claim 1, wherein angles between the first borders of the dummy sub-patterns in a column of dummy sub-patterns and a vertical line extending in a column direction are the same.

15. The display substrate according to claim 1, wherein angles between the first borders of dummy sub-patterns in a column of dummy sub-patterns and a vertical line extending in a column direction are different from one another.

16. A display device, comprising the display substrate according to claim 1 and an opposing substrate arranged opposite to the display substrate.

17. The display device according to claim 16, wherein a liquid crystal layer is provided between the opposing substrate and the display substrate, and the sensing electrode layer is located on a side of the base substrate facing away from the liquid crystal layer.

18. A method of manufacturing a display substrate, the method comprising:
forming a sensing electrode layer on a side of a base substrate through a patterning process such that the sensing electrode layer comprises a sensing electrode and a dummy pattern that comprises dummy sub-patterns arranged into columns, each dummy sub-pattern having a first border defining the dummy sub-pattern in a column direction, and first borders of respective dummy sub-patterns being non-periodically arranged,
wherein each dummy sub-pattern has a second border defining the dummy sub-pattern in a row direction, the second border is formed into a polygonal line, and corners of the polygonal line are covered by a black matrix,
wherein two adjacent strips of the black matrix and two adjacent polygonal lines define a preset number of pixel regions in the column direction, where the preset number is a positive integer, and
wherein the black matrix is located on a second side of the base substrate opposite to the first side where the sensing electrode layer is located.

\* \* \* \* \*